United States Patent
Patton et al.

(10) Patent No.: US 11,846,782 B1
(45) Date of Patent: Dec. 19, 2023

(54) ELECTRONIC DEVICES WITH DEFORMATION SENSORS

(71) Applicant: Apple Inc., Cupertino, CA (US)

(72) Inventors: Christopher Patton, Santa Cruz, CA (US); Clas M. Oldenbo, Palo Alto, CA (US); Scott M. DeLapp, San Diego, CA (US)

(73) Assignee: Apple Inc., Cupertino, CA (US)

( * ) Notice: Subject to any disclaimer, the term of this patent is extended or adjusted under 35 U.S.C. 154(b) by 106 days.

(21) Appl. No.: 17/185,100

(22) Filed: Feb. 25, 2021

Related U.S. Application Data

(60) Provisional application No. 63/009,365, filed on Apr. 13, 2020.

(51) Int. Cl.
*G02B 27/01* (2006.01)

(52) U.S. Cl.
CPC ..... *G02B 27/0176* (2013.01); *G02B 27/0172* (2013.01); *G02B 2027/0134* (2013.01); *G02B 2027/0143* (2013.01); *G02B 2027/0187* (2013.01)

(58) Field of Classification Search
CPC ............ G02B 27/0176; G02B 27/0172; G02B 2027/0178; G02B 2027/0198; G02B 2027/0187; G02B 2027/0134; G02B 2027/0143; G02B 27/017; G06F 3/011; G06F 3/017; G06F 3/163; G01L 1/2287; G01L 5/0019; G01L 5/0052; G01L 5/1627
See application file for complete search history.

(56) References Cited

U.S. PATENT DOCUMENTS

| | | | |
|---|---|---|---|
| 8,576,143 B1 * | 11/2013 | Kelly | G02B 27/017 359/630 |
| 9,135,863 B2 | 9/2015 | Duerksen et al. | |
| 9,191,658 B2 | 11/2015 | Kato et al. | |
| 9,213,163 B2 | 12/2015 | Lewis et al. | |
| 9,588,341 B2 | 3/2017 | Bar-Zeev et al. | |
| 11,200,646 B2 * | 12/2021 | Edwin | G06T 3/0068 |
| 2013/0038510 A1 * | 2/2013 | Brin | G02B 27/017 345/8 |
| 2014/0062841 A1 * | 3/2014 | Ishikawa | G06F 3/0338 345/8 |
| 2016/0117864 A1 * | 4/2016 | Cajigas | G06F 3/012 345/633 |

(Continued)

FOREIGN PATENT DOCUMENTS

WO  WO-2019018396 A1 *  1/2019 ......... G02B 27/0101

*Primary Examiner* — Xuemei Zheng
(74) *Attorney, Agent, or Firm* — Treyz Law Group, P.C.; G. Victor Treyz; Tianyi He

(57) ABSTRACT

A head-mounted device may have head-mounted support structures configured to be worn on a head of a user. The head-mounted device may have stereo optical components such as left and right cameras or left and right display systems. The optical components may have respective left and right pointing vectors. Deformation of the support structures may cause the camera pointing vectors and/or the display system pointing vectors to become misaligned. Sensor circuitry such as strain gauge circuitry may measure pointing vector misalignment. Control circuitry may control the cameras and/or the display systems to compensate for measured changes in pointing vector misalignment.

17 Claims, 6 Drawing Sheets

(56) References Cited

U.S. PATENT DOCUMENTS

| | | | |
|---|---|---|---|
| 2016/0171675 A1* | 6/2016 | Tseng | G06F 3/0383 |
| | | | 345/8 |
| 2017/0017082 A1* | 1/2017 | Wakabayashi | G06F 3/147 |
| 2019/0068944 A1* | 2/2019 | Zhang | G02B 27/0176 |
| 2019/0197982 A1* | 6/2019 | Chi | G06T 7/85 |
| 2019/0333480 A1 | 10/2019 | Lang | |
| 2020/0233213 A1* | 7/2020 | Porter | H04N 13/344 |
| 2022/0060675 A1* | 2/2022 | Ardisana, II | G02B 27/017 |

* cited by examiner

US 11,846,782 B1

ELECTRONIC DEVICES WITH DEFORMATION SENSORS

This application claims the benefit of provisional patent application No. 63/009,365, filed Apr. 13, 2020, which is hereby incorporated by reference herein in its entirety.

FIELD

This relates generally to electronic devices, and, more particularly, to wearable electronic devices such as head-mounted devices.

BACKGROUND

Electronic devices such as head-mounted devices have housings that are configured to be worn on a head of a user. During use of a head-mounted device, there is risk that components in the device may become misaligned due to deformation of the housing. For example, display components may become misaligned, which could adversely affect the ability of a user to satisfactorily view images.

SUMMARY

A head-mounted device may have head-mounted support structures configured to be worn on a head of a user. The head-mounted device may have stereo optical components such as left and right cameras or left and right display systems. The optical components may have respective left and right pointing vectors. For example, cameras may have pointing vectors associated with the directions in which the cameras are capturing images and display systems may have pointing vectors associated with the directions in which the display systems emit images.

The head-mounted support structures of a head-mounted device may include a bridge and temples to form a pair of glasses or may include housing walls and other housing structures that form goggles or other head-mounted device structures.

A left camera may capture images along a left camera pointing vector and a right camera may capture images along a right camera pointing vector. A left display system may have an output coupler or other display component that supplies a left image to a left eye box along a left display system pointing vector. A right display system may have an output coupler or other display component that supplies a right image to a right eye box along a right system pointing vector.

Deformation of the support structures due to forces from mounting a device on a user's head, due to damage from a drop event, due to thermal fluctuations, or due to other events, may cause the camera pointing vectors and/or the display system pointing vectors to become misaligned. Sensor circuitry such as strain gauge circuitry may measure pointing vector misalignment.

Control circuitry in the device may use sensor measurements to compensate for changes in the orientations of the pointing vectors with respect to each other. For example, the control circuitry may process image data captured using the left and right cameras to compensate for changes in the left and right camera pointing vector directions with respect to each other, thereby producing satisfactory stereo captured images. To compensate for changes in the left and right display system pointing vector orientations with respect to each other, the control circuitry may adjust the images produced by the left and/or right display systems (e.g., to adjust keystoning, to crop images, and/or to adjust other image attributes). In this way, the left and right images will fuse properly in the user's vision and will not suffer from distortion due to misalignment of the pointing vectors.

In an illustrative configuration, the head-mounted support structures are configured so that images for the left and right eye boxes will be satisfactorily aligned with respect to each other even if side portions of the head-mounted support structures are deformed.

DETAILED DESCRIPTION

Figure 1:
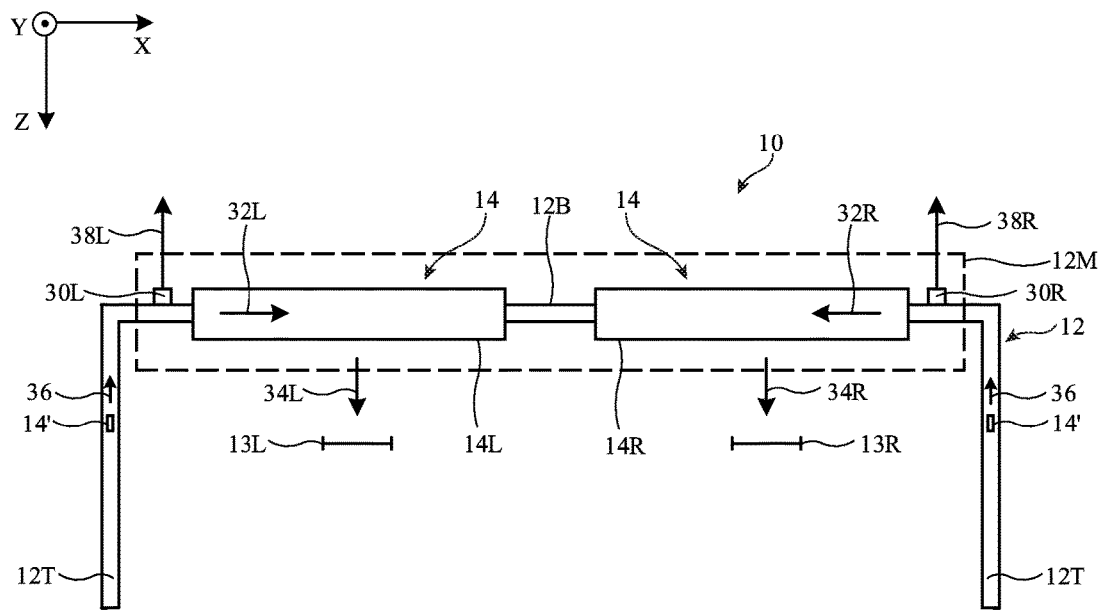
FIG. 1 is a top view of an illustrative head-mounted device in accordance with an embodiment.

Electronic devices such as head-mounted devices may be used to present images to a user. A top view of an illustrative head-mounted device is shown in FIG. 1. As shown in FIG. 1, head-mounted devices such as electronic device 10 may have head-mounted support structures such as housing 12. Housing 12 may be configured to be worn on a head of a user and may form glasses, a hat, a helmet, goggles, and/or other head-mounted device. Housing 12 may include head-mounted support structures such as straps, headbands, temples (e.g., in glasses), a nose bridge structure (e.g., in glasses), structures that rest against a user's face (e.g., in goggles), and/or other housing structures.

Device 10 may have display systems 14 for displaying images for a user. Display systems 14 may be mounted in housing 12. Display systems 14 may include display devices that create images (e.g., a pixel array such as a light-emitting diode pixel array, a scanning mirror device, a liquid-crystal-on-silicon display, a liquid crystal display, etc.) and may include optical components (e.g., lenses, waveguides, optical couplers, etc.). Housing 12 may have frame structures, housing walls, and other housing structures to help support and/or enclose display systems 14.

In the example of FIG. 1, housing 12 includes side portions such as housing portions 12T (sometimes referred to as temples when device 10 is a pair of glasses and sometimes referred to as side structures or side support structures), which may be configured to rest on a user's ears, central housing portion 12B (sometimes referred to as a bridge or nose bridge), which may be configured to couple display systems 14 together and to support device 10 on a user's nose, and optional housing wall portions for forming an enclosure (e.g., housing walls, etc.) such as main portion 12M. In general, housing 12 may have any suitable shape. Housing 12 may include support structures formed from fabric, polymer, metal, glass, ceramic, natural materials such as wood, and/or other material.

Display systems 14, which may sometimes be referred to as display modules, optical systems, optical modules, display panels, display components, optical components, or displays, may include left and right display systems such as left display system 14L and right display system 14R. Display system 14L may be used to present a left image to a user's left eye when the user's left eye is located in left eye box 13L. Display system 14R may be used to present a right image to a user's right eye when the user's right eye is located in right eye box 13L. During operation of device 10, the left and right images fuse in the user's field of view, thereby creating a fused stereoscopic (three-dimensional) image for the user.

Display systems 14 may be opaque or transparent. During operation, display systems 14 may be used in displaying images for a user. The images may include, for example, computer-generated images containing text, computer-generated objects, and other virtual image content. If desired, device 10 may have forward-facing cameras such as cameras 30L and 30R. There may be, for example, at least two, at least four, fewer than 14, fewer than ten, or other suitable number of cameras (visual and/or infrared image sensors) in device 10. In the example of FIG. 1, a pair of cameras are being used to gather stereo images (three-dimensional images) of the real-world environment surrounding device 10. Control circuitry in device 10 may perform image processing operations on images captured using the forward-facing cameras (e.g., to identify real-world objects). In some configurations, images from forward-facing cameras may be displayed for a user.

To create a mixed reality environment, device 10 may merge virtual image content and real-world image content. For example, in a configuration in which display systems 14 are opaque and block the user's view of the real-world, text and virtual objects can be electronically merged with real-world camera images (e.g., text and virtual objects can be overlaid on top of an image of the real-world that has been captured using a forward-facing camera).

If desired, display systems 14 may include optical combiners (e.g., transparent holographic output couplers, Bragg gratings, mirror structures, and/or other output coupler structures supported by waveguides). The optical combiners may be transparent to allow the user to view real-world objects through display systems 14. During operation, the optical combiners may receive images from display devices that are optically combined with the real-world image light from the real-world objects. This arrangement therefore allows the user to view virtual images from the display devices of systems 14 superimposed on real-world images (e.g., real-world objects directly viewed through systems 14).

As shown in FIG. 1, for example, display devices 14' (e.g., scanning mirror display devices or other display components that create images) may produce images for systems 14 that are conveyed to the front of device 10 in directions 36 using waveguides in housing 12. The waveguides may be formed from transparent polymer, glass, or other elongated transparent light guide material that is configured to guide light in accordance with the principle of total internal reflection. The waveguides may extend from housing portions 12T to the structures at the front of device 10. In the configuration of FIG. 1, portions of the waveguides overlap display systems 14.

Output couplers on the waveguides may be used to direct light out of the waveguides towards respective eye boxes. As shown by arrow 32L and arrow 34L, a left-hand waveguide and a left-hand output coupler on the waveguide in front of left eye box 13L may be used to convey a left image from the display device 14' on the left of device 10 to left eye box 13L. As shown by arrow 32R and arrow 34R, a right-hand waveguide and a right-hand output coupler on the waveguide in front of right eye box 13R may be used to convey a right image from the display device 14' on the right side of device 10 to right eye box 13R.

Because image light from systems 14 travels towards the eye boxes in directions 34L and 34R, directions 34L and 34R may sometimes be referred to respectively as left and right optical pointing vectors, left and right display system pointing vectors, left and right image pointing vectors, etc. Cameras 30L and 30R are used to capture images in directions 38L and 38R, respectively. Accordingly, directions 38L and 38R may sometimes be referred to respectively as left and right optical pointing vectors for cameras 30L and 30R, left and right camera pointing vectors, left and right image pointing vectors, etc.

To ensure satisfactory operation of stereo optical components such as the left and right display systems of device 10 and the left and right cameras of device 10, housing 12 is preferably sufficiently rigid to prevent excessive motion of optical components with respect to each other. For example, it may be desirable to configure housing 12 so the portion 12B (e.g., the bridge in a pair of glasses) does not deform excessively. Deformation of portion 12B may lead to misalignment between the left and right pointing vectors of cameras and display. Excessive misalignment of displayed images may lead to user discomfort and poor stereo image quality (e.g., situations where the user cannot readily fuse the left and right images into a satisfactory fused stereo image). Misalignment of cameras 30L and 30R may adversely affect stereo image capture operations.

Housing 12 may be subject to deformation when device 10 experiences an unintended drop event, when device 10 is exposed to large temperature fluctuations that cause different materials in housing 12 to expand or contact by disparate amounts, when structures in device 10 expand/or contract due to aging, when a user places stress on device 10 during use, or in other situations that place stress on the structures of housing 12. One way to combat misalignment issues involves creating strong (e.g., stiff and inflexible) mechanical structures in device 10. There is a limit, however, to the extent to which device 10 can be strengthened without adversely affecting the weight, size, and comfort of device 10 when worn by a user.

To avoid the need to create overly heavy and bulky support structures for device 10, device 10 can be provided with sensors that monitor deformations in the support structures. These sensors may be electrical sensors, capacitive sensors, resistive sensors, magnetic sensors, optical sensors, acoustic sensors, and/or other sensors. In an illustrative configuration, which is sometimes described herein as an example, device 10 is provided with one or more strain gauges to detect deformation of housing 12 and associated misalignment of optical pointing vectors for cameras, display systems, and/or other optical components. In response to measuring deformation of housing 12 and misalignment of the pointing vectors, corrective action may be taken. For example, control circuitry in device 10 may adjust the size, shape, and location of images on display systems 14L and 14R (e.g., the amount of keystoning in each image, the location of the image in the field of view of each display system, etc.) to ensure that the images supplied by the left and right display systems fuse properly in the user's vision and/or may process the image data for the captured images from left camera 38L and right camera 38R to satisfactorily fuse the left and right captured images, thereby effectively aligning the optical pointing vectors of these components as desired (e.g., by electrically compensating for the measured misalignment of the optical pointing vectors due to the deformation of housing 12).

Figure 2:
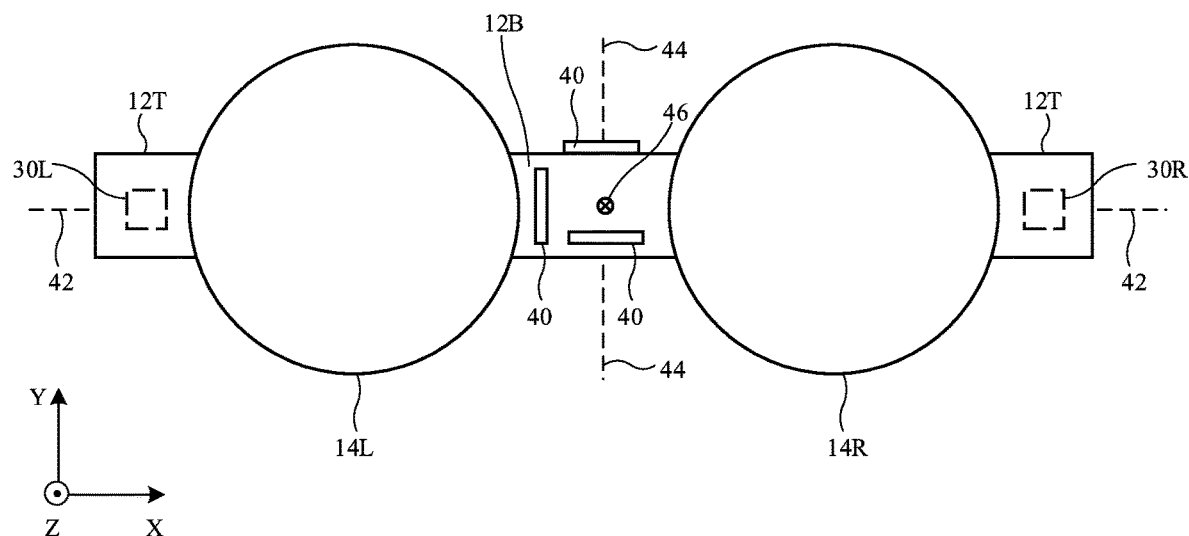
FIG. 2 is a rear view of an illustrative head-mounted device in accordance with an embodiment.

FIG. 2 is a rear view of device 10 in an illustrative configuration in which device 10 has a set of three strain gauges 40 for measuring optical pointing vector misalignment. As shown in in FIG. 2, these sensors are formed from strain gauges on housing portion 12B (e.g., on the bridge of a pair of glasses between systems 14L and 14R or other centrally located head-mounted support structures). In general, device 10 may have a single strain gauge, at least two strain gauges, at least three strain gauges, fewer than ten strain gauges, or other suitable number of strain gauges. Strain gauges 40 may be located on portion 12B, on portions of housing 12 such as portions 12T, and/or on other suitable support structures in device 10.

Strain gauges 40 may include meandering sensor lines that change resistance as a function of the amount of bending in the strain gauge. A resistive bridge circuit other circuit may be used to measure resistance changes that are indicative of changes in strain. Strain gauges 40 may, if desired, be aligned to detect bending about different axes. For example, a first of strain gauges 40 may have a sensor axis that extends horizontally and that is used to detect bending about vertical axis 44. Bending of housing portion 12B about axis 44 may cause the optical pointing vectors to diverge or converge more than desired. A second of strain gauges 40 may be configured to detect bending (e.g., twisting) about horizontal axis 42 (leading to up/down skew of the pointing vectors) and a third of strain gauges 40 may be configured to detect bending of housing 12B about axis 46 (which could lead to undesired rotational misalignment of the optical pointing vectors so that displayed images are tilted with respect to each other or so that captured images are tilted with respect to each other). The axes with respect to which strain gauges 40 measure deformation may be perpendicular to each other or may otherwise not be parallel to each other.

Figure 3:
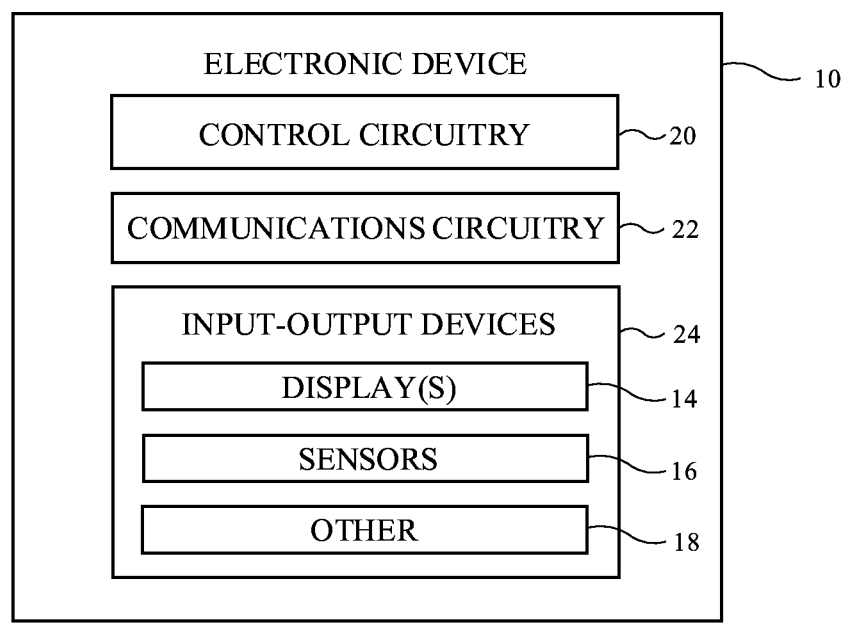
FIG. 3 is a schematic diagram of an illustrative head-mounted device in accordance with an embodiment.

Device 10 may use control circuitry to gather strain gauge measurements during operation of device 10 by a user and may make compensating adjustments to the operation of display systems 14 and/or cameras 30L and 30R in real time. A schematic diagram of device 10 is shown in FIG. 3. As shown in FIG. 3, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more display systems 14 based on display devices such as organic light-emitting diode displays, liquid crystal displays, microelectromechanical systems displays (e.g., a scanning mirror displays), displays having pixel arrays formed from crystalline semiconductor light-emitting diode dies (sometimes referred to as microLEDs), and/or other display devices.

Sensors 16 in input-output devices 24 may include force sensors (e.g., strain gauges such as strain gauges 40, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 4:
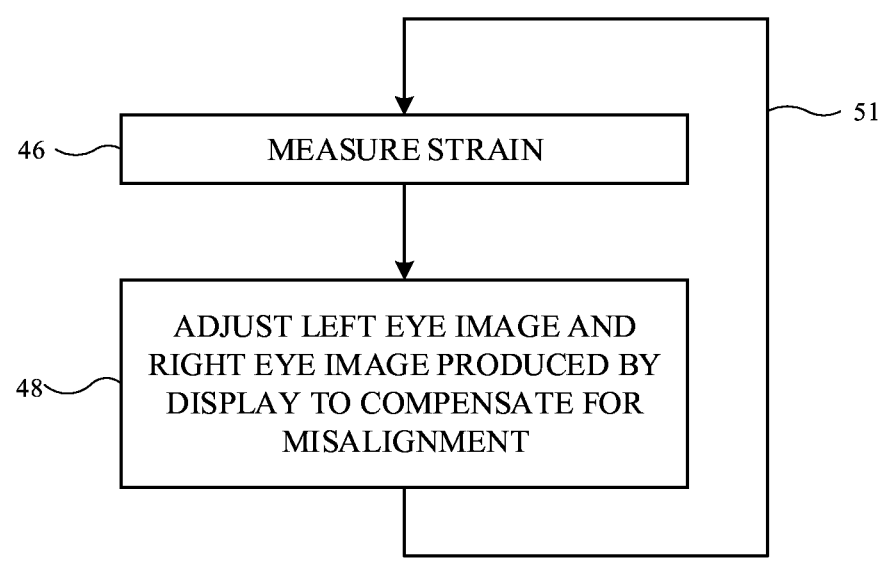
FIG. 4 is a flow chart of illustrative operations involved in operating a head-mounted device in accordance with an embodiment.

FIG. 4 is a flow chart of illustrative operations associated with operating device 10. During the operations of block 46, control circuitry 20 may use sensors 16 to characterize the amount of deformation present in housing 12. For example, strain gauges 40 may measure deformation (flexing, twisting, bending, etc.) of housing portion 12B or other portions of device 10 that causes optical pointing vectors associated with left and right optical components (e.g., display systems 14L and 14R, cameras 30L and 30R, etc.) to become misaligned. Misalignment may be measured in any suitable dimension(s) (e.g., bending misalignment that tends to cause pointing vectors to diverge or converge more than desired, rotational misalignment, tilting from housing twisting that leads to image skew, etc.).

During the operations of block 48, control circuitry 20 may adjust the left and right optical components to compensate for the measured misalignment of the optical components. For example, if tilting is detected, control circuitry 20 may adjust captured images and/or displayed images from the left and/or right optical components to create an opposing amount of tilt. If the strain gauge detects support structure bending that causes the left and right images to rotate with respect to each other, compensating counterrotation operations may be performed on captured images and/or the images being displayed by display systems 14 may be rotated with respect to each other. During these corrective operations, geometric distortion corrections or other image adjustments (e.g. image shifting, image resizing, image rotation, image cropping etc.) may be applied by control circuitry 20 (e.g., an appropriate amount of keystoning and may be applied to compensate for a detected amount of divergence or convergence or other misalignment, images may be shifted and/or cropped to ensure that the cropped images can fuse properly, etc.).

As shown by arrow 51, the operations of blocks 46 and 48 may be performed continuously while device 10 is in use to capture images and/or display images for a user. Because real-time optical misalignment compensation can help correct for undesired housing deformations due to drop events, thermal fluctuations, varying user stress scenarios, aging effects, and other sources of optical pointing vector misalignment, it is not necessary for housing 12 to be overly bulky and heavy.

Figure 5:
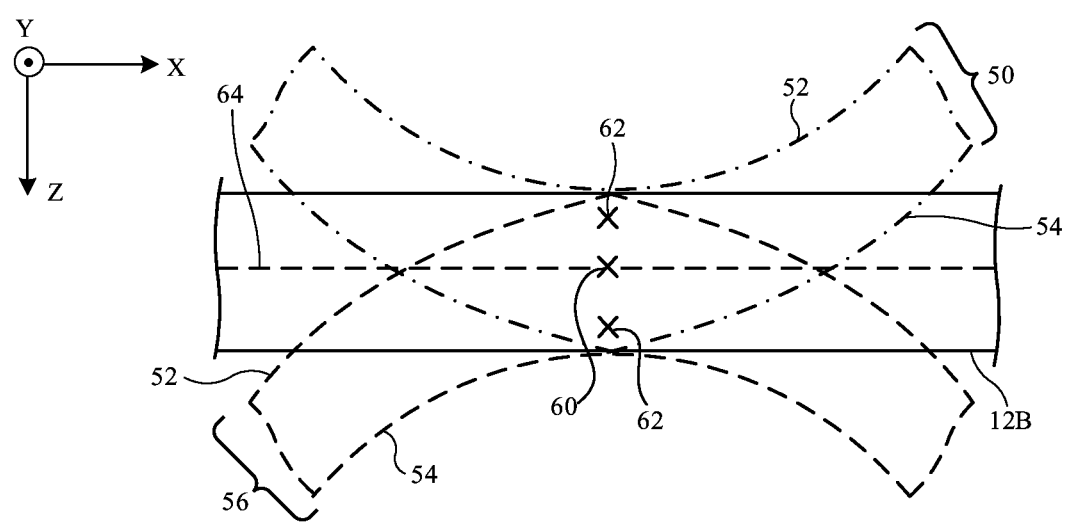
FIG. 5 is a top view of a portion of an illustrative head-mounted device that may be deformed in accordance with an embodiment.

Sensors 16 such as strain gauges 40 may be mounted to a surface of a housing member in housing 12, may be embedded within housing structures 40, may be attached to members that couple to a housing frame or housing wall, and/or may otherwise be incorporated into housing 12 and device 10. As shown in FIG. 5, housing structures such as housing portion 12B may have an associated neutral stress plane 64. When portion 12B is bent towards position 50, surface 52 of portion 12B will be in compression and opposing surface 54 will be in tension. When portion 12B is bent in the opposite direction towards position 56, however, surface 52 will be in tension and surface 54 will be in compression. In either event, the portions of housing 12B along neutral stress plane 50 will exhibit less stress than the surfaces of housing 12B. In configurations in which strain gauge 40 is expected to be over-stressed by normal amounts of bending of housing 12, it may be desirable to place strain gauge 40 at a location within housing portion 12B such as a location at or near position 60. At position 60, the strain gauge will be aligned with the neutral stress plane of portion 12B and will therefore experience reduced amounts of stress. In configurations in which it is expected that operation of the strain gauge at position 60 will produce less strain gauge output than desired, it may be desirable to place the stain gauge out of alignment with neutral stress plane 50 (e.g., at one of positions 62 or on surface 52 or surface 54, so that the strain gauge is offset with respect to the neutral stress plane), thereby enhancing the responsiveness of the stain gauge when making measurements of bend-induced stresses in housing portion 12B.

Figure 6:
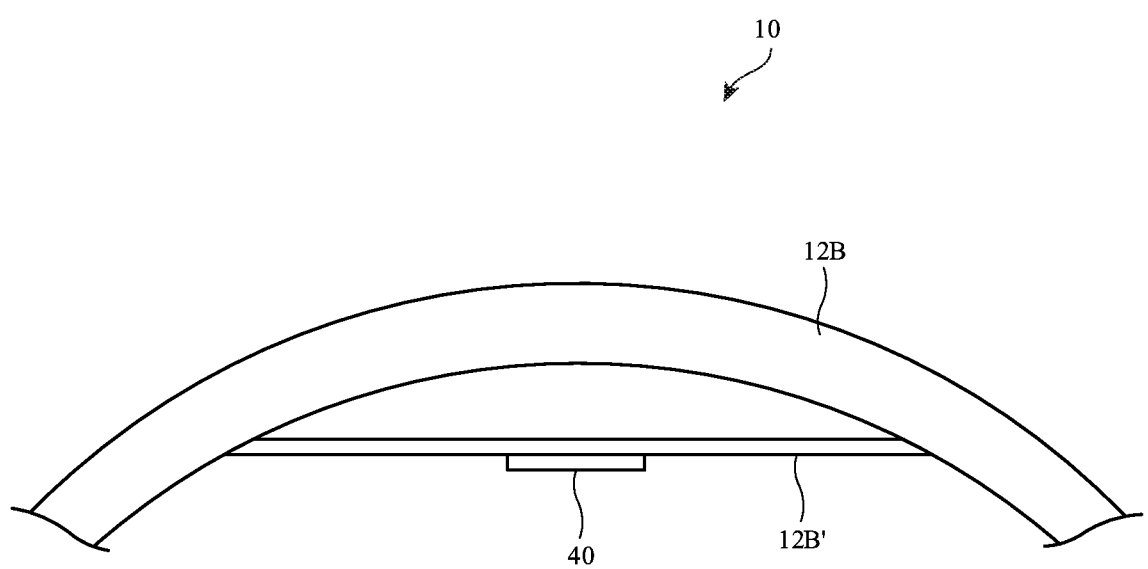
FIG. 6 is a top view of a portion of an illustrative head-mounted device showing how a misalignment sensor such as a strain gauge may be mounted on a housing member that is configured to enhance sensitivity of the strain gauge to housing bends in accordance with an embodiment.

If desired, strain gauges 40 may be mounted on housing structures that are configured to enhance stress and thereby enhance the sensitivity of strain gauges 40 when monitoring bending of housing 12. Consider, as an example, housing portion 12B of FIG. 6. Because housing portion 12B is relatively stiff, it may be challenging for a strain gauge that is mounted on housing portion 12B to accurately measure bending. Accordingly, an ancillary housing member such as housing member 12B' may be coupled to housing portion 12B. Member 12B' may, if desired, be formed from a material with properties that differ from those of housing portion 12B (e.g., a different elastic modulus such as a lower elastic modulus to promote localized bending, a different material composition, a different thickness, etc.). As a result of the structure (size, shape, etc.), materials, and/or location of member 12B' relative to portion 12B, a strain gauge such as strain gauge 40 of FIG. 6 that is located on member 12B' may accurately measure deformation of housing 12 and misalignment of the optical pointing vectors associated with optical components in device 10.

Figure 7:
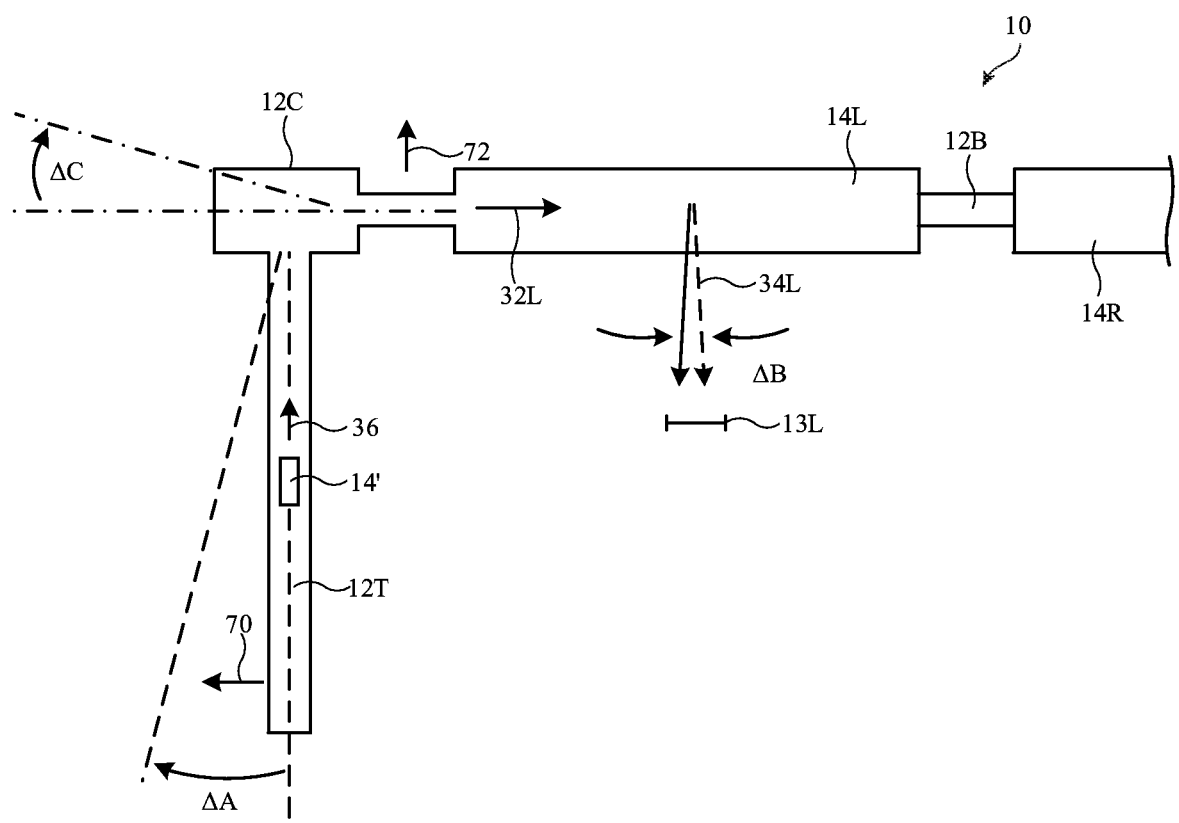
FIG. 7 is a top view of a portion of an illustrative head-mounted device that is configured to mechanically compensate for optical component pointing vector misalignment due to bending forces in accordance with an embodiment.

In configurations of the type shown in FIG. 1 in which display devices 14' for system 14 are located on housing portions 12T, there is an opportunity for light rays from devices 14' (e.g., guided image light from devices 14' associated with displayed images) to be deflected as portions of housing 12 near the front corners of housing 12 are deformed. FIG. 7 is a diagram of a left-hand portion of device 10 in an illustrative configuration in which display device 14' (e.g., a display projector based on a scanning mirror or other display device) is located on a left-hand housing portion 12T (e.g., a left-hand temple in a pair of glasses). In this arrangement, emitted light from device 14' is guided within a waveguide to display system 14L. Initially, emitted light travels in direction 36. At corner housing portion 12C, the light in the waveguide turns and continues in direction 32L. Once in front of eye box 13L, an output coupler (e.g., a holographic grating on the waveguide or other optical output coupler that overlaps the portion of the waveguide in front of eye box 13L) couples the image light out of the waveguide towards eye box 13L for viewing by the user's left eye in eye box 13L.

In the absence of bending stresses on device 10, the various portions of housing 12 in device 10 may retain their desired initial alignment and the image from device 14' of the display system may be satisfactorily routed in a desired direction (e.g., image output direction 34L will be aligned with eye box 13L). If, however, bending forces are applied to device 10, there is a potential that housing 12 will deform. As an example, if a user's head is large, the temples of device 10 may be forced outward by the sides of the user's head. The left temple of device 10 (e.g., housing portion 12T of FIG. 7) may, as an example, be forced in direction 70, thereby causing corner portion 12C and portion 12B of the housing of device 10 to bend outwardly and cause display system 14L to move in direction 72. As shown in FIG. 7, for a given design of housing 12, deflection of housing portion 12T in direction 70 by an angle ΔA will cause the front of housing 12 and display system 14L to deflect in direction 72 by an angle ΔC and these deflections will cause the output image from system 14L to deflect (misalign) by angle ΔB relative to eye box 13L.

There is a risk that undesirably large amounts of weight and bulk will be added to device 10 in configurations that attempt to prevent misalignment only by stiffening housing 12. Accordingly, it may be desirable to configure device 10 to minimize the magnitude of display image misalignment angle ΔB even in instances where housing 12 deforms due to bending stresses. With an illustrative approach, housing 12 (e.g., the stiffness of housing portion 12C and the stiffness of housing portion 12B) is configured so that ΔB is equal to zero or is significantly less than angle ΔA (e.g., ΔB=0 within 2%, 5%, 10%, 20%, or other suitable tolerance level or otherwise has a value that is close to 0 such as a magnitude less than 0.05°, less than 0.1°, less than 0.2°, or less than 1°) whenever ΔA is not equal to zero (e.g., whenever the magnitude of ΔA is between 0.1° and 2°, when ΔA is between 1° and 5°, when ΔA is at least 2°, when ΔA is at least 3°, and/or when ΔA has other suitable angular deflections). As just one of these illustrative examples, ΔB may be maintained at a value less than 0.2° when ΔA is at least 2°. Housing arrangements where deflections of housing portions 12T do not affect the direction of the display pointing vectors and therefore do not misalign displayed images in device 10 may, as an example, be obtained when housing 12 is configured so that ΔC is equal to ΔA/2. When device 10 (e.g., the deformation characteristic of each bendable portion of housing 12) is configured so that the angular deflection ΔC experienced by display system 14L is equal to ΔA/2 (within 2%, 5%, 10%, 20%, or other suitable tolerance level), device 10 may exhibit a negligible (or at least a reduced amount) of pointing vector misalignment due to housing deformations. This approach may, if desired, be used in conjunction with the use of active adjustment of the optical components of device 10 based on pointing vector misalignment measurements made using sensors 16 (e.g., housing deformation measurements made using strain gauge circuitry).

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:
    a housing;
    a sensor that is configured to measure deformation of the housing with respect to a first axis and with respect to a second axis that is not parallel to the first axis;
    a left display system configured to display a left image in a left eye box and a right display system configured to display a right image in a right eye box, wherein the housing has a bridge portion that couples the left display system to the right display system and wherein the sensor comprises strain gauge circuitry disposed on the bridge portion and configured to measure the deformation of the housing with respect to the first and second axes from the bridge portion of the housing; and
    control circuitry configured to control the left and right display systems based on the measured deformation of the housing to compensate for misalignment of the left and right display systems.

2. The head-mounted device defined in claim 1 wherein the strain gauge circuitry is mounted to the bridge portion to detect bending of the bridge portion.

3. The head-mounted device defined in claim 1 wherein the strain gauge circuitry comprises a first strain gauge on the bridge portion of the housing configured to measure the deformation of the housing with respect to the first axis and a second strain gauge on the bridge portion of the housing configured to measure the deformation of the housing with respect to the second axis.

4. The head-mounted device defined in claim 1 wherein the housing has left and right temples coupled respectively to the left display system and the right display system.

5. The head-mounted device defined in claim 1 wherein the strain gauge circuitry is configured to measure deformation of the bridge portion of the housing with respect to the first and second axes.

6. The head-mounted device defined in claim 1 wherein the strain gauge circuitry comprises a first strain gauge coupled to the bridge portion of the housing and configured to bend about the first axis and wherein the strain gauge circuitry comprises a second strain gauge coupled to the bridge portion of the housing and configured to bend about the second axis.

7. The head-mounted device defined in claim 1 wherein the left display system provides the left image to the left eye box in a direction associated with a left optical pointing vector and wherein a stiffness of the bridge portion of the housing and a stiffness of a corner portion of the housing coupling a left temple of the housing to the bridge portion of the housing are configured to maintain deflection of the left optical pointing vector to less than 0.2° in response to deflection of the left temple by at least 2°.

8. A head-mounted device, comprising:
    a head-mounted housing having a nose bridge;
    first and second optical components in the head-mounted housing having respective first and second optical pointing vectors;
    a sensor configured to measure deformation of a portion of the head-mounted housing between the first and second optical components, wherein the sensor comprises a first strain gauge on the nose bridge of the head-mounted housing configured to measure the deformation of the portion of the head-mounted housing with respect to a first axis and a second strain gauge on the nose bridge of the head-mounted housing configured to measure the deformation of the portion of the head-mounted housing with respect to a second axis that is not parallel to the first axis; and control circuitry configured to control the first and second optical components based on information from the sensor to compensate for misalignment of the first and second optical pointing vectors.

9. The head-mounted device defined in claim 8 wherein the first and second optical components comprise, respectively, first and second cameras.

10. The head-mounted device defined in claim 8 wherein the first and second optical components comprise, respectively, first and second display components that provide respective first and second images to corresponding first and second eye boxes.

11. The head-mounted device defined in claim 8 wherein the sensor comprises a third strain gauge configured to measure the deformation of the portion of the head-mounted housing with respect to a third axis that is not parallel to the first axis and not parallel to the second axis.

12. A head-mounted device, comprising:
a left optical system configured to supply a left eye box with a left image along a left optical pointing vector;
a right optical system configured to supply a right eye box with a right image along a right optical pointing vector;
head-mounted support structures coupled to the left and right optical systems, wherein the head-mounted support structures comprise a support member between the left and right optical systems and coupled to a housing portion that extends between the left and right optical systems, wherein the housing portion has a first elastic modulus, and wherein the support member has a second elastic modulus that is less than the first elastic modulus; and sensor circuitry configured to measure changes in alignment between the left and right optical pointing vectors, wherein the sensor circuitry comprises a strain gauge on the support member.

13. The head-mounted device defined in claim 12 further comprising control circuitry configured to control the left and right optical systems to compensate for measured misalignment between the left and right optical pointing vectors.

14. The head-mounted device defined in claim 13 further comprising a left camera and a right camera with a left camera pointing vector and a right camera pointing vector, respectively, wherein the sensor circuitry is configured to measure changes in orientation between the left and right camera pointing vectors due to deformation of the head-mounted support structures, and wherein the control circuitry is configured to process image data from the left and right cameras to compensate for the measured changes in orientation between the left and right camera pointing vectors.

15. The head-mounted device defined in claim 12 wherein the support member is characterized by a neutral stress plane and wherein the strain gauge is at a location that is offset with respect to the neutral stress plane.

16. The head-mounted device defined in claim 12 wherein the strain gauge is configured to measure deformation of the support member with respect to a first axis and wherein the sensor circuitry comprises an additional strain gauge that is configured to measure deformation of the support member with respect to a second axis that is not parallel to the first axis.

17. The head-mounted device defined in claim 12 wherein the left optical system is configured to receive the left image from a left display projector and wherein the right optical system is configured to receive the right image from a right display projector.

* * * * *